June 17, 1930. K. B. JOHN ET AL 1,764,024
PROCESS FOR PREPARING CONTACT MASS
Original Filed June 21, 1928   2 Sheets-Sheet 1
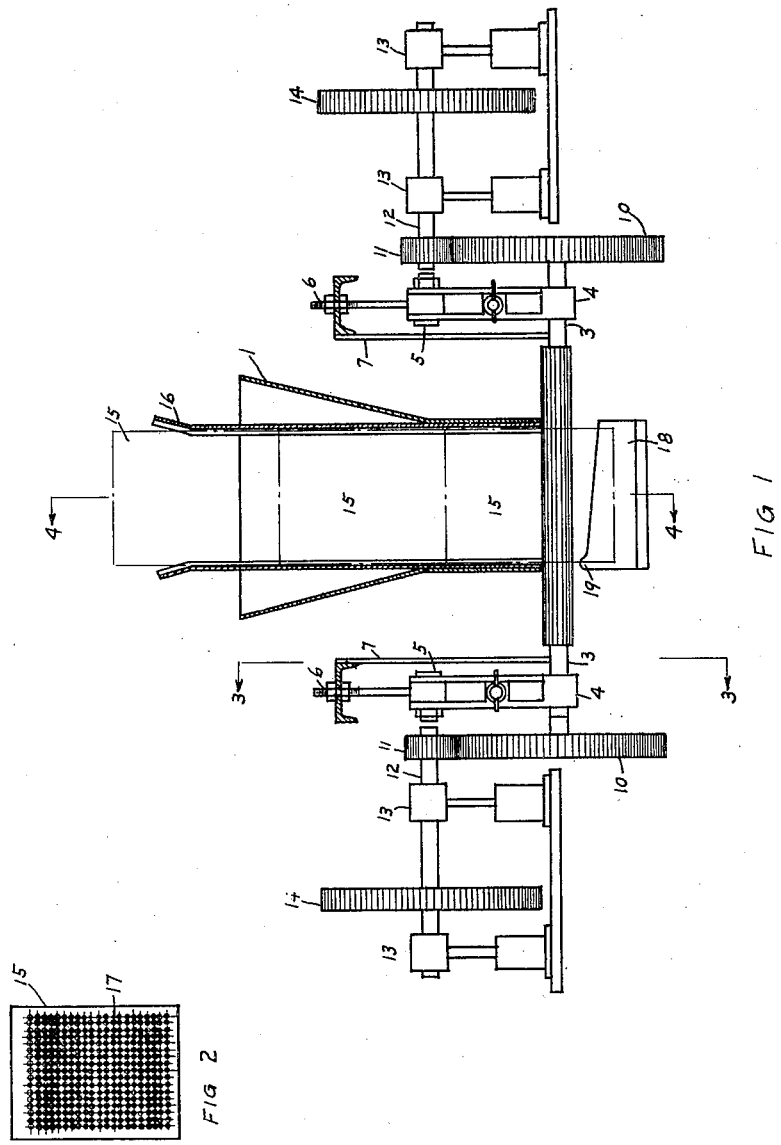
INVENTORS
KENNETH B. JOHN
CARL W. COSLOW
CHRISTIAN J. SCHWINDT
BY Robert Ames Norton ATTORNEY FIG. 3
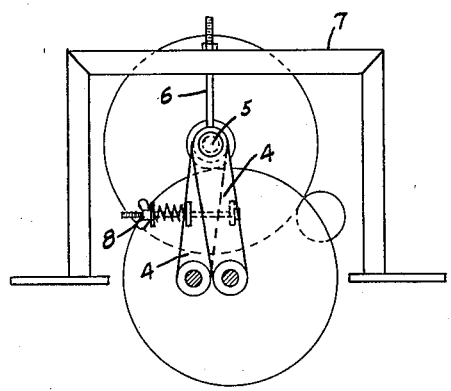
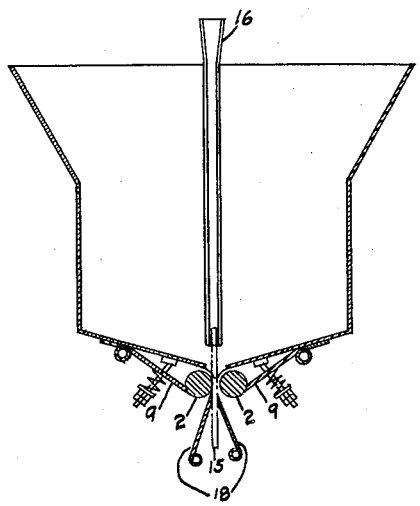
FIG 4
INVENTORS
KENNETH B. JOHN
CARL W. COSLOW
CHRISTIAN J. SCHWINDT
BY Robert Ames Norton ATTORNEY Patented June 17, 1930

1,764,024

UNITED STATES PATENT OFFICE

KENNETH B. JOHN, OF WILMINGTON, DELAWARE, AND CARL W. COSLOW AND CHRISTIAN J. SCHWINDT, OF PITTSBURGH, PENNSYLVANIA, ASSIGNORS TO THE SELDEN COMPANY, OF PITTSBURGH, PENNSYLVANIA, A CORPORATION OF DELAWARE

PROCESS FOR PREPARING CONTACT MASS

Original application filed June 21, 1928, Serial No. 287,170. Divided and this application filed February 14, 1929. Serial No. 339,899.

This invention relates to a process of forming contact mass pellets from moistened pulverulent material.

Contact mass for many reactions such as for example, the contact sulfuric acid process, the oxidation of certain organic compounds, etc. is made by compacting material which consists of more or less finely divided aggregates such as kieselguhr moistened with catalytically active binders. The examples of such catalysts compositions may be found in the patents to Alphons O. Jaeger, No. 1,694,123 dated December 4, 1928; No. 1,675,308 dated June 26, 1928; No. 1,675,309 dated June 26, 1928; No. 1,685,635 dated Sept. 25, 1928; No. 1,692,126 dated Nov. 20, 1928; and patent to Jaeger and Bertsch, No. 1,657,754 dated January 31, 1928. The particular catalytic compositions do not form any part of the present invention which is directed to a method of forming pellets from any catalyst compositions having similar physical characteristics.

The formation pellets from catalyst compositions consisting of finely divided material moistened with binders usually requires pressing the material into plates or dies with accurate perforations which perforations are filled with the adherent powdered material which is then pressed to compact it and cause it to assume the form of the perforation in the die. In order to produce the best results, it is necessary to exert considerable pressure equally from both sides and rollers are used in the present invention to exert such pressure on the material in the plate which rollers must be capable of swinging apart as the plates pass through them. At the same time it is desirable that the drive of the rollers be very uniform and positive even though the rollers may be separated by quite a distance. In the preferred embodiment of the present invention, therefore, flexible drives such as belts or chains are not used for the rollers which are driven by a non-flexible drive such as a gear train or friction wheels. Where it is desired to effect large production with a minimum of labor it is also desirable to use an automatic feeding mechanism for the plates though the invention is not limited to a process in which the plates are fed automatically.

In general in carrying out the process of the present invention plates having suitable perforations are passed down through a hopper containing the moist catalytic material. The feed of the plates may either be automatic or manual. The bottom of the hopper opens on the rolls and as the plates pass through, the material in the perforations is compacted by the rolls which are so arranged that they can move apart without disengaging the gears. Preferably this is effected by providing the rollers with gears meshing with other gears on parallel shafts, the rollers being journaled in frames which are capable of rocking about an axis coinciding with the axes of the drive shafts so that no matter how far the rolls swing apart the distance from the roll axis to the center of the drive shaft remains constant and therefore the driving and driven gears remain continuously in mesh on a pitch circle of unvarying diameter.

The invention will be described in greater detail in connection with the manufacture of diluted zeolite contact masses in which kieselguhr moistened with a zeolite gel is formed into cylindrical pellets. The figures of the drawings show a machine in which the process can be carried out.

Fig. 1 is a vertical section through a tablet machine embodying the features of the present invention;

Fig. 2 is a plan view of a plate;

Fig. 3 is a vertical section taken at right angles to Fig. 1 along the line 3—3; and Fig. 4 is a vertical section at right angles to Fig. 1 taken along the line 4—4.

The machine consists essentially in a hopper 1, and compacting rolls 2 which may be smooth or ribbed. The rolls are mounted on shafts 3, passing through frames 4, which frames are rotatable about pins 5, adjustably supported by the threaded rods 6 in frames 7 which are rigidly attached to the main machine frame. The frames 4 are drawn together by the adjustable springs 8. Suitable spring pressed scrapers 9 (see Fig. 4) are provided to clean the rolls from adherent powdered material. It is vitally essential with diluted zeolite contact masses that the rolls be scraped clean of adherent material as otherwise they will not properly compact the material over the plate surface, thus producing pellets of unsatisfactory physical structure and surface. Each roll shaft carries a gear 10, the gears for both rolls being on either the same end or opposite ends, the latter case being shown in Fig. 1. The gears are in turn driven by pinions 11, meshing therewith, which pinions are keyed to shafts 12 coaxial with the pins 5. These shafts 12 are suitably journaled in mountings 13 on the main frame and may be driven through gears 14 or by any other suitable means. For simplicity's sake, the gears on the ends of the rolls are shown on opposite ends of the roll shafts and two gears 14 are shown. In practice it is generally simpler to use a single driving source and have gears 10 on the same side of the machine. The principle of operation, of course, is identical.

In operation the hopper is filled with zeolite-kieselguhr powder and plates 15 pass down through the plate magazine (see Figs. 1 and 4) passing from the plate magazine through the powdered material at the bottom of the hopper and then between the rolls 2. The powder which fills the perforations 17 in the plates 15 to overflowing is compressed into the perforations by the rollers, thus forming firm pellets in the plate. Any surplus powder is scraped from the rollers by the scrapers 9 (see Fig. 4). The plates after passing through the rollers can then be placed by hand on a plate with suitable projections registering with the perforations in order to press out the pellets formed.

It will be apparent that the machine operates simply and reliably, the rollers 2 always being in tight contact either with special separators or with the plates as they pass through and the machine operates uninterruptedly with plates of any thickness. The plate feeding magazine permits more rapid operation as the plates are fed by gravity when in the correct position but where large production is not essential the magazine may be dispensed with and the plates may be placed in the hopper by hand. It is usually necessary to agitate the powder in order to keep it in contact with the emerging plates and to prevent any tendency to forming lumps. This may be done manually or any suitable jarring means may be employed, such as for example a tapper which continuously taps the side of the hopper 1. These devices are of well known type and are not shown in the drawings.

It is desirable to clean the plates of adherent material before removing the pellets. This may be done by hand, but is preferably effected by suitable scraping means incorporated in the tablet machine. In the drawing these means are shown diagrammatically as two spring pressed knives 18 (see Figs. 1 and 4). The knives are provided with inclined cutting edges, and each knife possesses a lip 19, bent back so that the plate striking the lip 19 forces the knives apart sufficiently to permit it to pass therethrough. The sharp knife edges clean off superfluous material and the pellets can then be discharged as described above. Any other suitable scraping means may be used, such as revolving knives, revolving brushes, and the like. We have found that knives are very satisfactory with diluted zeolite contact masses, but for other pulverulent material different devices sometimes present advantages, and the skilled engineer will use the scraping device best adapted for use with the material from which he is preparing his pellets.

While it is a peculiar advantage of the present invention that it is possible to drive the machine entirely positively through gears without encountering any difficulties in meshing with different roll separations, it should be understood that the machine can also be operated with flexible driving means, such as chains and belts, in which case the fact that the axes of the roll shafts swing about an axis coincident with that of the driving shaft keeps a uniform tension on the flexible driving means, a very great advantage although not as essential as in the case of gears for it is of course possible to operate machines in which the axes do not move in circles around the drive shaft when flexible driving means are used but, of course, a much less effective drive is obtained. The advantages of the present invention, therefore, are very marked even with highly flexible drives.

This application is a division of our co-pending application Serial No. 287,170, filed June 21, 1928, now Patent 1,741,312, December 31, 1929.

What is claimed as new is:

1. A process of forming catalyst pellets, which comprises introducing a compactible pulverulent catalyst material into the perforations extending entirely through a plate or die, passing the plate between compacting means acting from both sides and adapted to exert substantially uniform pressure on both sides of the plate, removing adherent material from the surfaces of the plate and pressing out the pellets therefrom.

2. A process of forming catalyst pellets, which comprises introducing a compactible pulverulent catalyst material into the perforations extending entirely through a plate or die, passing the plates between compacting means acting from both sides and exerting substantially uniform pressure on both sides of the plate, uniformly driving forward the plate irrespective of variations in the thickness thereof, removing adherent material from the surfaces of the plate and pressing out pellets therefrom.

Signed at Carneys Pt., N. J., this 24th day of January, 1929.

KENNETH B. JOHN.

Signed at Pittsburgh, Pennsylvania, this 11th day of February, 1929.

CARL W. COSLOW.
   CHRISTIAN J. SCHWINDT.